US012651970B2

(12) United States Patent
Arima

(10) Patent No.: US 12,651,970 B2
(45) Date of Patent: Jun. 9, 2026

(54) SWITCHING POWER SUPPLY DEVICE AND POWER CONTROL SEMICONDUCTOR DEVICE

(71) Applicant: Satoshi Arima, Isehara (JP)

(72) Inventor: Satoshi Arima, Isehara (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 202 days.

(21) Appl. No.: 18/774,976

(22) Filed: Jul. 17, 2024

(65) Prior Publication Data

US 2025/0105746 A1 Mar. 27, 2025

(30) Foreign Application Priority Data

Jul. 19, 2023 (JP) ................................ 2023-117537

(51) Int. Cl.

| | |
|---|---|
| ***H02M 1/14*** | (2006.01) |
| ***H02M 1/00*** | (2006.01) |
| ***H02M 3/335*** | (2006.01) |

(52) U.S. Cl.

CPC ..... *H02M 3/33507* (2013.01); *H02M 1/0032* (2021.05); *H02M 1/14* (2013.01)

(58) Field of Classification Search

CPC ... H02M 3/33507; H02M 1/0032; H02M 1/14

See application file for complete search history.

(56) References Cited

U.S. PATENT DOCUMENTS

| | | | | |
|---|---|---|---|---|
| 10,491,128 | B2 * | 11/2019 | Arima | H02M 3/33523 |
| 11,703,550 | B2 * | 7/2023 | Arima | G01R 31/14 324/127 |
| 11,962,246 | B2 * | 4/2024 | Kikuchi | H02M 1/0009 |
| 2025/0030348 | A1 * | 1/2025 | Arima | H02M 3/33523 |

FOREIGN PATENT DOCUMENTS

| | | | |
|---|---|---|---|
| JP | 006424644 | B2 | 11/2018 |
| JP | 007032648 | B2 | 3/2022 |

* cited by examiner

*Primary Examiner* — Adolf D Berhane

(74) *Attorney, Agent, or Firm* — Shih IP Law Group, PLLC

(57) ABSTRACT

A switching power supply includes a transformer, a switching element connected to the primary-side winding, a power control semiconductor device that outputs a signal for performing ON/OFF control of the switching element, and a current-voltage conversion element connected to the switching element. The semiconductor device includes: a first terminal that receives a voltage/current corresponding to an output from the secondary side of the transformer; a second terminal that receives the voltage converted by the current-voltage conversion element; a period signal generation circuit that generates a signal for periodically turning on the switching element; a current detection circuit that generates a signal for turning off the switching element, based on a voltage/current at the first terminal and a voltage at the second terminal; and a complementary current circuit that outputs a complementary current to the second terminal. A complementary resistor is provided between the second terminal and the current-voltage conversion element.

6 Claims, 12 Drawing Sheets

Tps

VFB AGAINST PERIOD OF
PERIOD SIGNAL

V$_{FB}$

Ics, Fsw

Ics1

Ics

Fsw

Ics2

VREF1 VREF2 VREF3 V$_{FB}$

AVERAGE SWITCHING FREQUENCY

Rc : SMALL

Rc : LARGE

Iout

SWITCHING POWER SUPPLY DEVICE AND POWER CONTROL SEMICONDUCTOR DEVICE

REFERENCE TO RELATED APPLICATIONS

This application is based upon and claims the benefit of priority from the prior Japanese Patent Application No. 2023-117537, filed on Jul. 19, 2023, the entire contents of which are incorporated herein by reference.

TECHNICAL FIELD

The present disclosure relates to an insulated switching power supply device provided with a transformer for voltage conversion and a power control semiconductor device used for the switching power supply device.

DESCRIPTION OF RELATED ART

As a type of a DC power supply device, an AC-DC converter (switching power supply device) employs a switching control method of turning on and off a switching element connected in series to the primary-side winding of a voltage conversion transformer to control current flowing through the primary-side winding and thereby control the voltage induced in the secondary-side winding. To control the operation in the primary side, the AC-DC converter employing the switching control method is provided with a current detection resistor connected in series to the primary-side switching element, and the power control circuit (IC) is provided with a terminal (current detection terminal) that receives a voltage into which current is converted by the current detection resistor. Based on the detected current value and the feedback voltage from the secondary side, the AC-DC converter controls the peak current flowing through the primary-side winding to keep the secondary-side output voltage/current at a constant level.

Further, as an AC-DC converter configured to control outputs based on the voltage into which current is converted by the current detection resistor and the feedback voltage from the secondary side, a known AC-DC converter performs pulse width modulation (PWM) in a medium to heavy load range and performs a burst operation in a light load range. In the burst operation, the AC-DC converter temporarily stops switching and outputs power corresponding to the light load, thereby reducing switching losses and increasing power efficiency when the load is light.

The applicant of the present invention conceived an invention that relates to a power control semiconductor device (power control IC) constituting a switching power supply device and applied for a patent thereof (Japanese Patent No. 6424644). According to the invention, the power control semiconductor device is newly provided with an external terminal for connecting an external resistor. By changing the resistance value of an external resistor connected to the new external terminal, a user can change the switching frequency control characteristics to cope with noise by changing setting from outside and also can change the reference value of the feedback terminal for stopping and restarting switching.

SUMMARY OF THE INVENTION

Since the invention of JP6424644B requires the additional external terminal (ADJ) for connecting the external resistor, with which the switching frequency control characteristics and setting are changed, the invention may require package changes and cause an increase in costs when applied to a power control semiconductor device with a limited number of terminals. Further, the switching power supply device in JP6424644B has a trade-off between power efficiency and output ripple. According to JP6424644B, increasing power efficiency causes greater output ripple, whereas reducing output ripple causes lower power efficiency.

Japanese patent No. 7032648 discloses an invention that relates to a switching power supply device configured to flow correction current to a correction resistor connected to a detection terminal of a power control semiconductor device, as with the present application. However, the object of the invention of JP7032648B is for a power controlling semiconductor device provided with an overcurrent detection circuit and configured to switch output voltages to appropriately determine, by utilizing an external correction resistor, an output overcurrent limit depending on output voltages. The object of the invention of JP7032648B is therefore different from the object of the present invention. Since the objects are different, the challenges with respect to the characteristics of correction current (in this application, complementary current) flowing to the correction resistor (in this application, complementary resistor) are also different between the invention of JP7032648B and the present invention.

The present invention has been conceived in view of the above problems. An object of the present invention is to provide a switching power supply device and a primary-side power control semiconductor device constituting the switching power supply device that allow changes in switching frequency control characteristics by external setting change, especially in the light load range, without requiring an additional external terminal to which an external resistor is connected.

Another object of the present invention is to provide a switching power supply device and a power control semiconductor device that allow easy adjustment of power efficiency and output ripple, which are in a tradeoff relationship, by changing the resistance value of the external resistor.

To achieve the abovementioned object, according to an aspect of the present invention, there is provided a switching power supply device including: a transformer for voltage conversion that includes a primary-side winding to which a direct voltage is applied and a secondary-side winding; a switching element connected in series to the primary-side winding; a power control semiconductor device that generates and outputs a control signal for performing ON/OFF control of the switching element; and a current-voltage conversion element that is connected in series to the switching element and that converts a current flowing through the primary-side winding into a voltage, wherein the switching power supply device intermittently flows a current to the primary-side winding by performing ON/OFF control of the switching element, rectifies and smooths a current induced in the secondary-side wiring, and outputs a direct current voltage, wherein the power control semiconductor device includes a first external terminal that receives a voltage or a current corresponding to an output detection signal from a secondary side of the transformer, a second external terminal that receives the voltage into which the current is converted by the current-voltage conversion element, a period signal generation circuit that generates a period signal for giving timing to periodically turn on the switching element, a current detection circuit that generates a signal for giving timing to turn off the switching element, based on a voltage or a current at the first external terminal and a voltage at the second external terminal, and a complementary current circuit that generates a complementary current to be output to the second external terminal, wherein a complementary resistor is provided between the second external terminal and the current-voltage conversion element.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, a preferable embodiment of the present disclosure is described with reference to the figures. However, the scope of the present invention is not limited to the disclosed embodiment.

Figure 1:
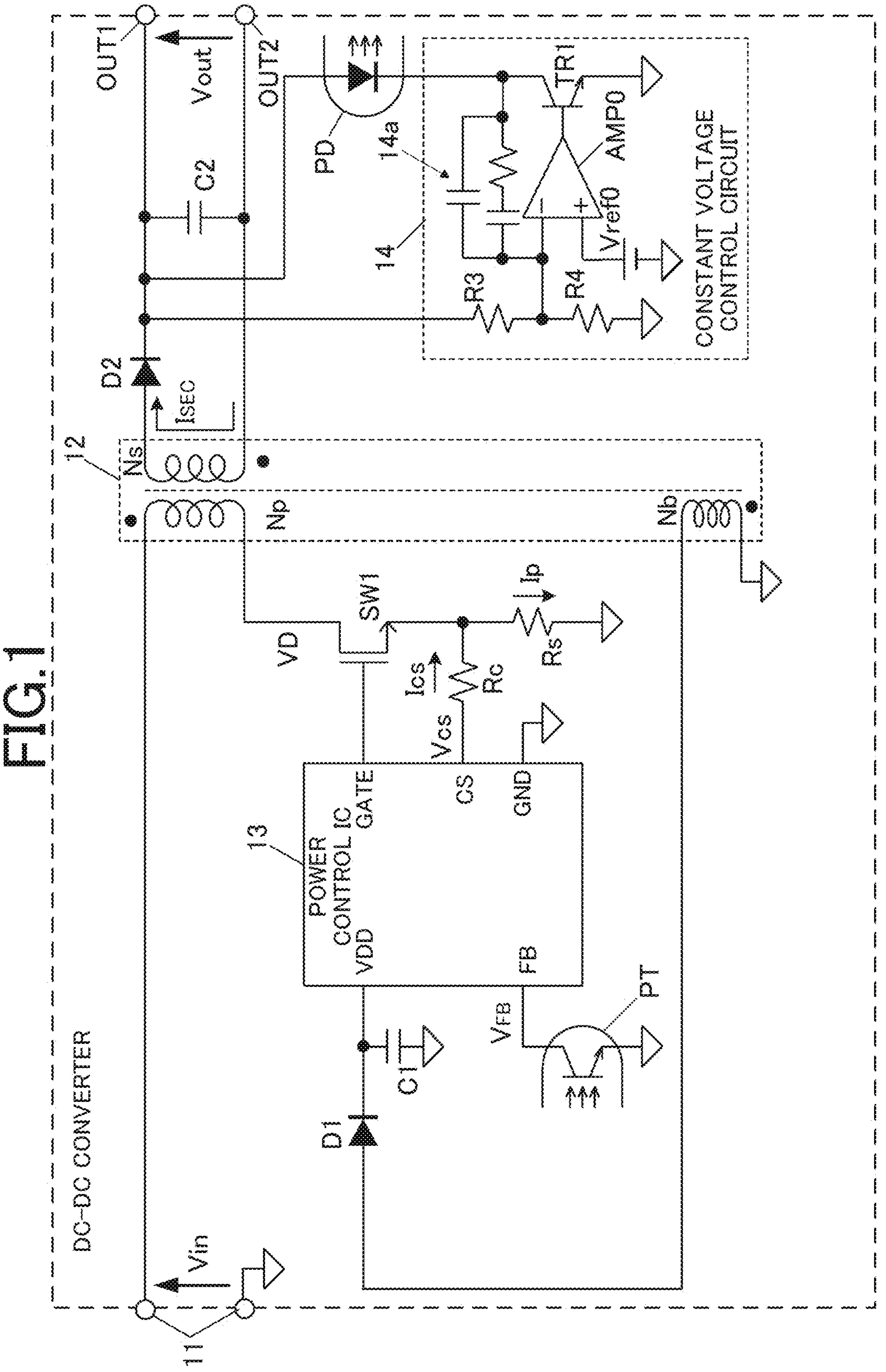
FIG. 1 is a circuit diagram of an embodiment of a DC-DC converter (DC power supply device) to which a power control semiconductor device of the present disclosure is effectively applied.

FIG. 1 is a circuit diagram of an embodiment of an insulated DC-DC converter (DC power supply device) to which a power control semiconductor device according to the present disclosure is applied.

The insulated DC-DC converter in this embodiment includes a pair of voltage-input terminals 11 to which a direct voltage is input; a transformer 12 for voltage conversion that includes a primary-side winding Np, a secondary-side winding Ns, and an auxiliary winding Nb; a switching transistor SW1 connected in series to the primary-side winding Np of the transformer 12; and a power control semiconductor device (hereinafter called a power control IC) 13 configured to turn on and off the switching transistor SW1. To constitute a switching power supply device (AC-DC converter), a diode bridge circuit and a smoothing capacitor are connected in the pre-stage of the input terminals 11 for rectifying AC voltages from an AC power source.

In this embodiment, the switching transistor SW1 is an N-channel MOSFET (insulated-gate field-effect transistor) as a discrete component. The power control IC 13 includes an output terminal GATE for outputting a gate drive signal that drives the gate of the transistor SW1.

The DC-DC converter in this embodiment includes a rectification-smoothing circuit in the primary side of the transformer 12. The rectification-smoothing circuit is constituted of a rectifier diode D1 connected in series to the auxiliary winding Nb and a smoothing capacitor C1 connected between the cathode terminal of the rectifier diode D1 and the ground point GND. The voltage rectified and smoothed by the rectification-smoothing circuit is applied to the power-supply voltage terminal VDD of the power control IC 13.

The power control IC 13 includes an external terminal FB connected to a photo transistor (light receiving element) PT. The photo transistor PT constitutes a photocoupler that transmits an output detection signal from the secondary side as the feedback voltage VFB to the primary side.

The power control IC 13 includes an external terminal CS as a current detection terminal that receives a voltage VCS into which a current is converted by a current detection resistor Rs connected between the source terminal of the switching transistor SW1 and the ground point GND. Between the external terminal CS and the connection node connecting the switching transistor SW1 and the current detection resistor Rs, a complementary resistor Rc is connected. The complementary resistor Rc is described in detail later.

At the secondary side of the transformer 12, the DC-DC converter includes: a rectifier diode D2 connected in series to a terminal of the secondary-side winding Ns; and a smoothing capacitor C2 connected between the cathode terminal of the rectifier diode D2 and the other terminal of the secondary-side winding Ns. By intermittently flowing a current through the primary-side winding Np, an AC voltage is induced in the secondary-side winding Ns. The rectifier diode D2 and the smoothing capacitor C2 rectify and smooth the voltage induced in the secondary-side winding Ns to generate and output a DC voltage Vout. The primary-side winding Np and the secondary-side winding Ns of the transformer 12 have reversed polarities and constitute a flyback converter.

At the secondary side of the transformer 12, the DC-DC converter includes: a constant voltage control circuit (shunt regulator) 14 as an output voltage detection circuit that detects the output voltage Vout; and a light-emitting diode (light-emitting element) PD that constitutes the photocoupler for transmitting, to the primary side, an output voltage detection signal corresponding to the voltage detected by the constant voltage control circuit 14.

Through the light-emitting diode PD, a current corresponding to the voltage detected by the constant voltage control circuit 14 flows. The light-emitting diode PD transmits a light signal having an intensity corresponding to the detected voltage to the primary side. Through the phototransistor PT, a current corresponding to the light intensity flows and is converted to the feedback voltage VFB for input by a pull-up resistor in the power control IC 13 (Rp in FIG. 2), for example.

The constant voltage control circuit 14 includes: a bipolar transistor TRI connected in series to the light-emitting diode PD; resistors R3, R4 that divide the secondary-side output voltage Vout; an error amplifier AMP0 that compares the divided voltage with a reference voltage Vref0 and outputs a voltage corresponding the potential difference; and a phase compensator circuit 14*a*. The voltage output by the error amplifier AMP0 is applied to the base terminal of the bipolar transistor TRI, so that a current corresponding to the output voltage Vout flows. In this embodiment, the greater the secondary-side output voltage Vout is, the greater the current flowing through the light-emitting diode PD is, and the greater the current flowing through the phototransistor PT is. As a result, the voltage VFB at the external terminal FB of the power control IC 13 decreases.

Although this embodiment includes the rectifier diode D2 at the secondary side, the rectifier diode D2 may be replaced with a switch to perform synchronous rectification.

Next, the functional block configuration and functions of blocks constituting an embodiment of the power control IC 13, which is provided at the primary side of the power supply device in FIG. 1, are described with reference to FIG. 2 to FIG. 6.

Figure 2:
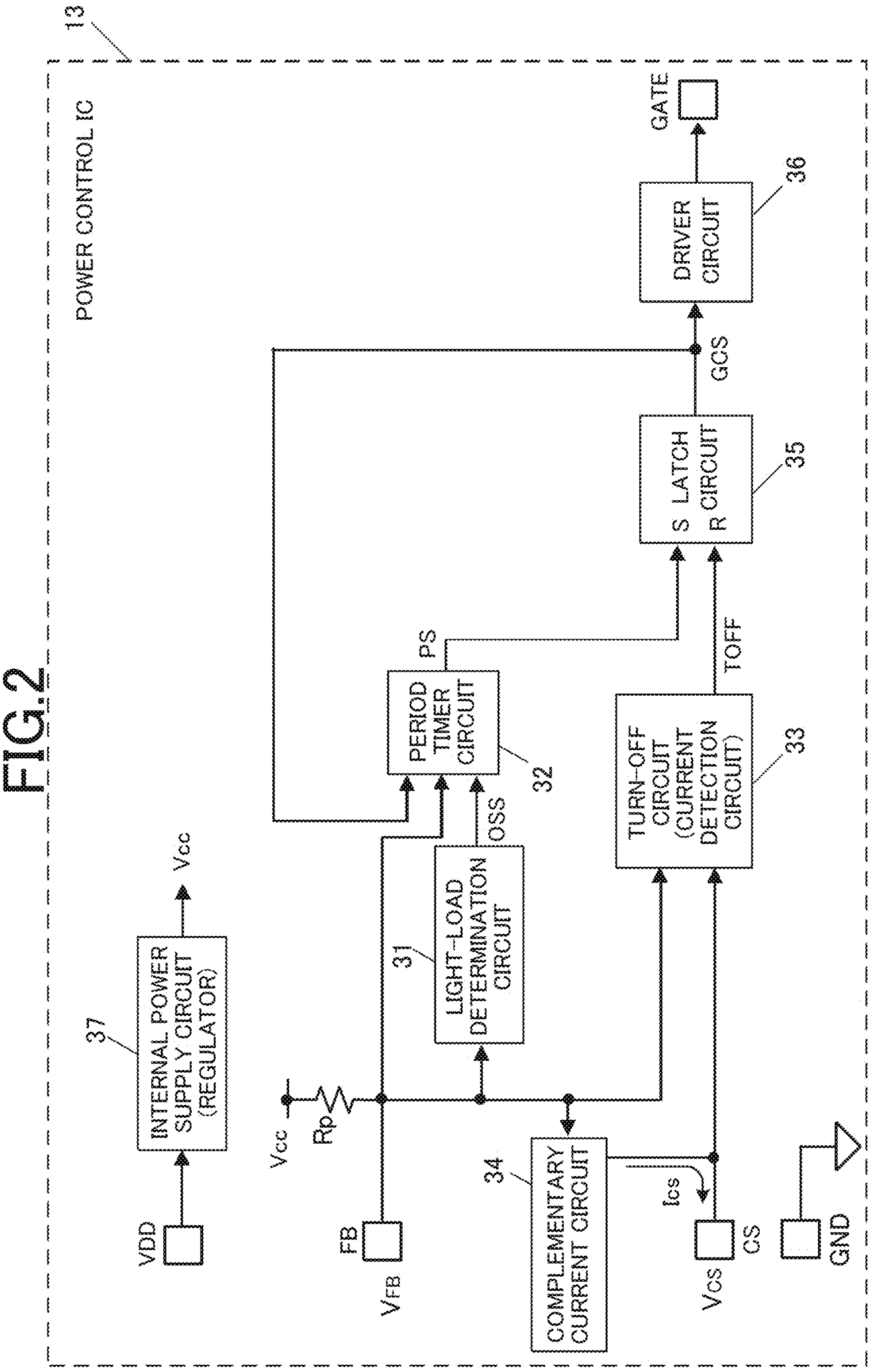
FIG. 2 is a block diagram showing an embodiment of the power control semiconductor device according to the present disclosure, the semiconductor device being provided at the primary side of a transformer in the DC-DC converter in FIG. 1.

The power control IC 13 in this embodiment is configured to perform the PWM control (hereinafter called the PWM operation) and the burst operation, depending on whether the load is light or heavy. To perform such operations, as shown in FIG. 2, the power control IC 13 in this embodiment includes a light-load determination circuit 31 that determines whether the load is light or heavy; a period timer circuit 32 that generates a period signal PS for giving the switching period; and a turn-off circuit 33 (current detection circuit) that receives inputs of the voltage VFB at the external terminal FB and the voltage VCS at the current detection terminal VCS and that generates a turn-off timing signal for turning off the switching transistor SW1.

Among the functional circuits, the period timer circuit 32 generates the period signal PS having a period corresponding to the voltage VFB at the external terminal FB to which a feedback signal from the secondary side is input.

The power control IC 13 in this embodiment further includes a complementary current circuit 34 that flows a complementary current Ics to a complementary resistor Rc connected to the current detection terminal CS. The complementary current Ics output by the complementary current circuit 34 is flown to the current detection resistor Rs via the complementary resistor Rc. Accordingly, the voltage Vcs at the current detection terminal CS shifts (increases) to a high level by the amount corresponding to the amount of the complementary current Ics and the resistance of the complementary resistor Rc.

The power control IC 13 further includes: a latch circuit 35 constituted of an RS flip-flop, for example, that receives inputs of the period signal PS output by the period timer circuit 32 and the signal TOFF output by the turn-off circuit 33 and that outputs a gate control signal GCS; and a driver circuit 36 that generates, based on the gate control signal GCS, a gate driving signal (driving pulse) for turning on and off the switching transistor SW1 and outputs the gate driving signal from the external terminal GATE.

The gate control signal GCS is supplied to the period timer circuit 32 to actuate the period timer circuit 32. The power control IC 13 includes an internal power supply circuit 37 constituted of a voltage regulator, such as a series regulator, that gives an operating voltage to the above-mentioned functional circuits.

Figure 3:
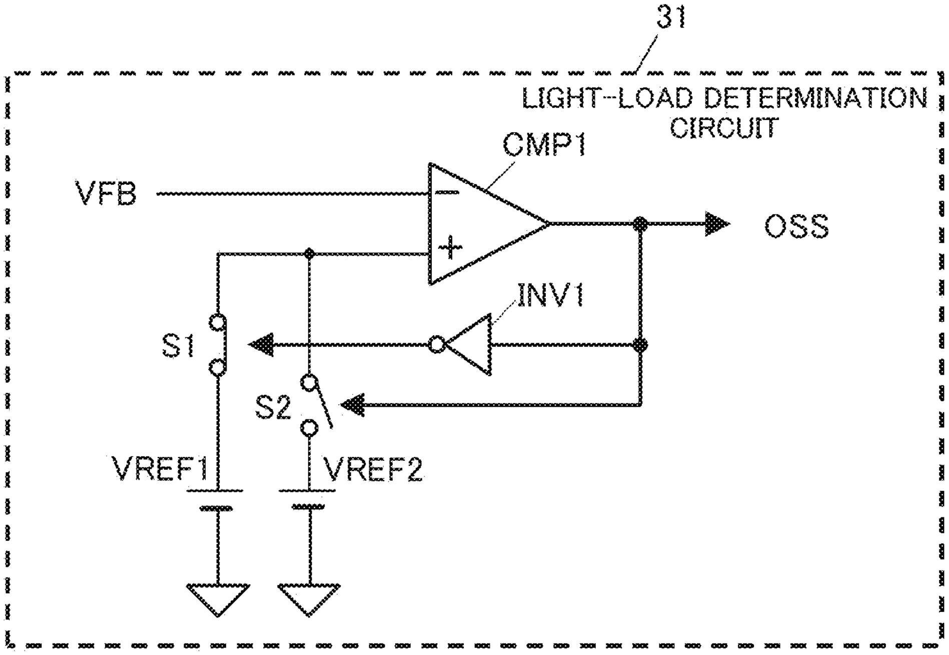
FIG. 3 is a circuit diagram showing a specific example of a light-load determination circuit that constitutes the power control semiconductor device in the embodiment.

Among the functional blocks 31 to 36 constituting the power control IC 13, the light-load determination circuit 31 includes: a comparator (voltage comparator circuit) CMP1 that compares the voltage VFB at the external terminal FB with a predetermined reference voltage VREF1 or VREF2 (VREF1<VREF2); and switches S1, S2 for selectively supplying the reference voltage VREF1 or VREF2 to the non-inverting input terminal of the comparator CMP1, as shown in FIG. 3. The output of the comparator CMP1 is supplied as an oscillation stop signal OSS to the period timer circuit 32 in the post stage.

The switch S1 is turned on and off by a signal into which the output of the comparator CMP1 is inverted by the inverter INV1. The switch S2 is turned on and off by the signal output by the comparator CMP1. Thus, hysteresis is given to the process of determining whether the load is light or not, and the comparator CMP1 can be prevented from outputting high-level and low-level outputs in a short period of time when the voltage VFB is around the reference voltage VREF1. However, hysteresis is not essential.

Figure 4:
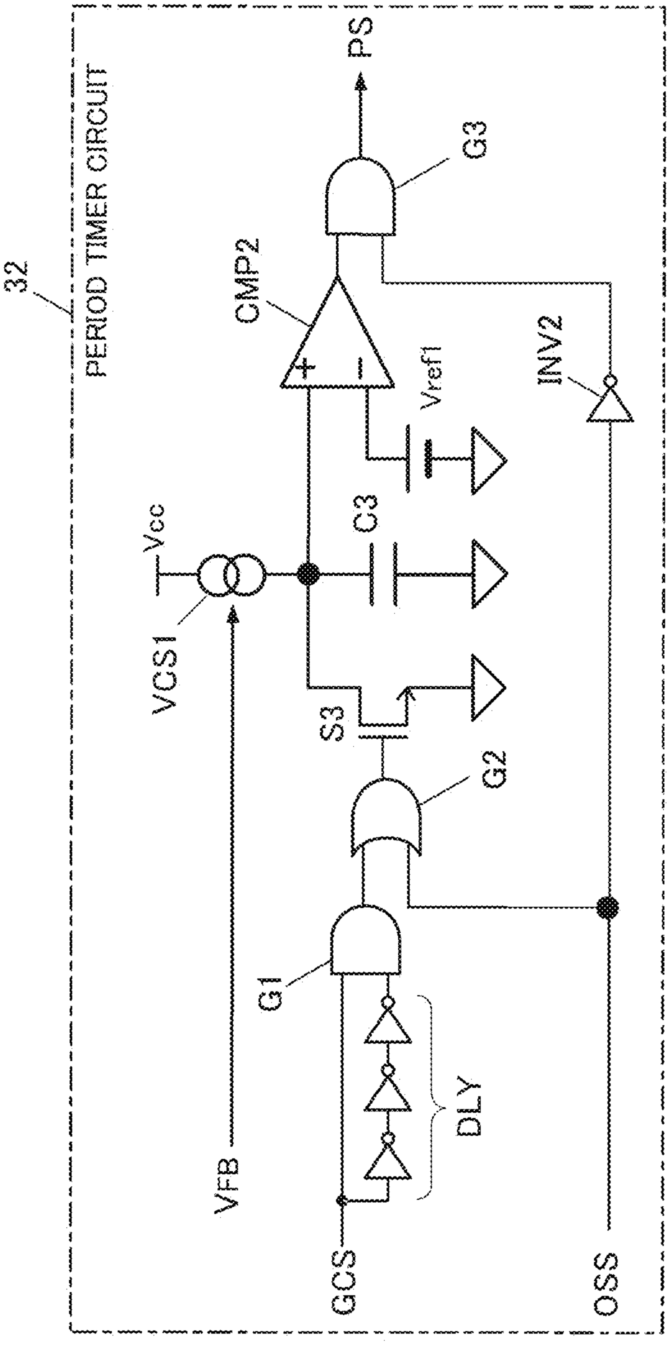
FIG. 4 is a circuit diagram showing a specific example of a period timer circuit that constitutes the power control semiconductor device in the embodiment.

As shown in FIG. 4, the period timer circuit 32 includes: an AND gate G1 that receives the gate control signal GCS output by the latch circuit 35 and the inverted and delayed signal of the gate control signal GCS inverted and delayed by a delay circuit DLY constituted of a series inverter; and an OR gate G2 that receives the output of the AND gate G1 and the oscillation stop signal OSS output by the light-load determination circuit 31.

The period timer circuit 32 further includes: a variable current source VCS1 that flows a current corresponding to the voltage VFB at the external terminal FB; a capacitor C3 that charges with the current from the variable current source VCS1; and a discharging switching transistor S3 for discharging the capacitor C3. The output of the OR gate G2 is applied to the gate terminal of the switching transistor S3.

The period timer circuit 32 further includes a comparator CMP2 that compares the voltage of the capacitor C3 with a predetermined reference voltage Vref1; and an AND gate G3 that receives the output of the comparator CMP2 and the oscillation stop signal OSS output by the light-load determination circuit 31. When the oscillation stop signal OSS becomes low, the output of the inverter INV2 opens the AND gate G3, and the output of the comparator CMP2 is output as the period signal PS. When the oscillation stop signal OSS becomes high, the output of the inverter INV2 closes the AND gate G3, thereby shutting off the output of the period signal PS. Further, when the oscillation stop signal OSS becomes high, the output of the OR gate G2 is kept high, and the oscillation operation of the period timer circuit 32 is stopped.

When the load is light, the oscillation stop signal OSS stops the period timer circuit 32, and when the oscillation stop signal OSS changes to actuate the period timer circuit 32, the switching transistor SW1 is repeatedly turned on and off until the period timer circuit 32 is again stopped. Thus, the burst operation is performed when the load is light (see FIG. 11 and FIG. 12).

In the period timer circuit 32 shown in FIG. 4, when the gate control signal GCS changes from the low level to the high level, the output of the AND gate G1 changes to the high level for a predetermined period of time (delay time by the delay circuit DLY), the switching transistor S3 is turned on, and the capacitor C3 discharges. When the gate control signal GCS changes to the low level and the switching transistor S3 is turned off, the capacitor C3 starts charging. After a predetermined period of time elapses that is determined by the capacitance value of the capacitor C3 and the current value of the variable current source VCS1, the voltage of the capacitor C3 reaches Vref1, and the output of the comparator CMP2 changes from the low level to the high level.

Figure 7A:
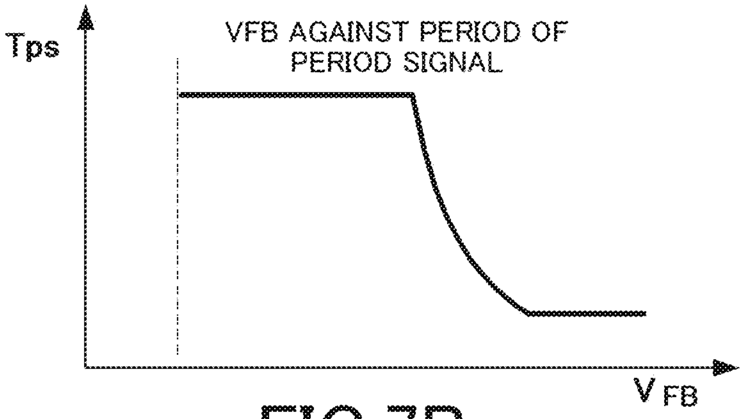
FIG. 7A is a graph showing the relation between the feedback voltage and the period of the period signal of the power control semiconductor device in the embodiment.

Thus, the comparator CMP2 outputs the period signal PS that has a period corresponding to the voltage VFB. That is, the period timer circuit 32 includes a frequency-variable oscillator circuit. FIG. 7A shows an example of the relation between the voltage VFB at the external terminal FB and the period Tps of the period signal PS.

Figure 5:
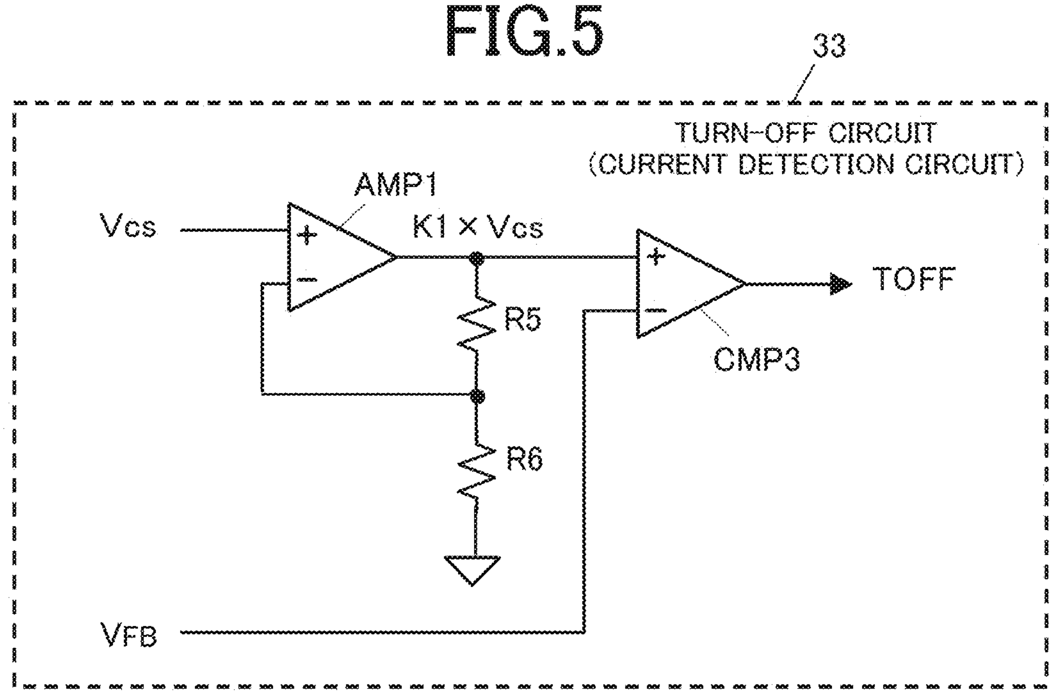
FIG. 5 is a circuit diagram showing a specific example of a turn-off circuit (current detection circuit) that constitutes the semiconductor device in the embodiment.

FIG. 5 shows a detailed example of the circuit configuration of the turn-off circuit 33 as a current detection circuit. As shown in FIG. 5, the turn-off circuit 33 includes: an operational amplifier AMP1 that receives, at the non-inverting input terminal, the voltage Vcs at the external terminal CS; and a comparator CMP3 that receives, at the non-inverting input terminal, the output of the operational amplifier AMP1 and receives, at the inverting input terminal, the voltage VFB at the external terminal FB. Further, resistors R5, R6 are connected in series between the output terminal of the operational amplifier AMP1 and the ground point. The voltage divided by the resistors R5, R6 is input to the inverting input terminal of the operational amplifier AMP1.

Thus, the operational amplifier AMP1 operates as a non-inverting amplifier circuit having an amplification factor (K1) corresponding to the resistance ratio between the resistors R5 and R6. The operational amplifier AMP1 outputs a signal amplified by K1×Vcs. When the voltage output by the operational amplifier AMP1 (K1×Vcs) exceeds the voltage VFB at the external terminal FB, the output of the comparator CMP3 changes from the low level to the high level. The output of the comparator CMP3 is supplied as the turn-off signal TOFF to the latch circuit 35, and the switching transistor SW1 is turned off.

Figure 6:
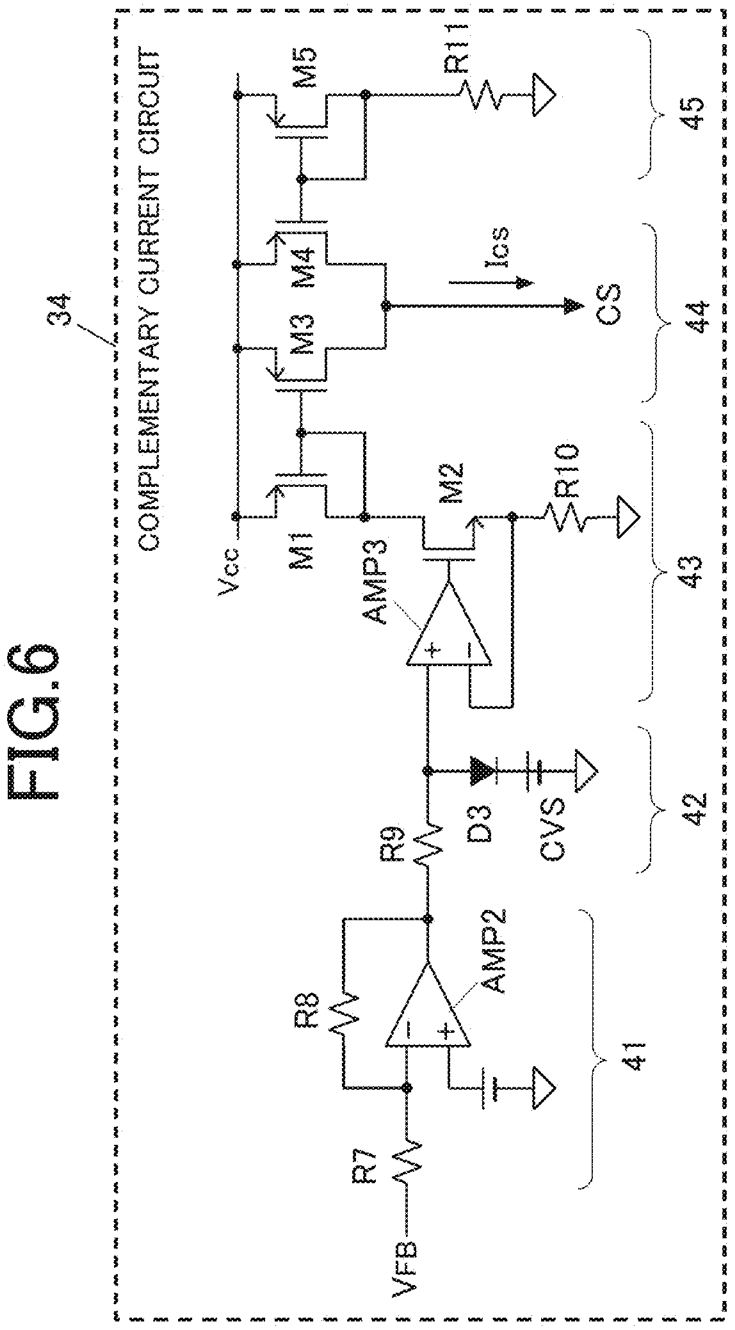
FIG. 6 is a circuit diagram showing a specific example of a complementary current circuit that constitutes the power control semiconductor device in the embodiment.

FIG. 6 shows a detailed example of the circuit configuration of the complementary current circuit 34.

As shown in FIG. 6, the complementary current circuit 34 in this embodiment includes an inverting amplifier circuit 41, a clamp circuit 42, and a voltage-current conversion circuit 43. The inverting amplifier circuit 41 includes an input resistor R7, an operational amplifier AMP2, and a feedback resistor R8 and amplifies the voltage VFB at the external terminal FB. The clamp circuit 42 includes a diode D3 and a constant voltage source CVS and clamps the output of the inverting amplifier circuit 41 input via a resistor R9. The voltage-current conversion circuit 43 includes an operational amplifier AMP3 that receives, at the non-inverting input terminal, the voltage passing through the clamp circuit 42, MOS transistors M1 and M2 connected in series between the power-supply voltage terminal and the ground point, and a resistor R10. With the clamp circuit 42, the complementary current circuit 34 can determine the complementary current Ics1 when the voltage VFB at the external terminal FB is low (light load range).

The complementary current circuit 34 in this embodiment further includes a current output circuit 44 and a bias circuit 45. The current output circuit 44 includes a MOS transistor M3 and a MOS transistor M4. The MOS transistor M3 is connected to the MOS transistor M1 of the voltage-current conversion circuit 43 to constitute a current mirror circuit. The drain of the MOS transistor M4 and the drain of the MOS transistor M3 are connected. The bias circuit 45 applies a predetermined voltage to the gate terminal of the transistor M4. The bias circuit 45 includes a diode-connected MOS transistor M5 connected in series between the power-supply voltage terminal and the ground point and a resistor R11. The gate terminal of the MOS transistor M5 is connected to the gate terminal of the transistor M4 of the current output circuit 44. Thus, the current output circuit 44 outputs the complementary current Ics that corresponds to the potential difference between the voltage applied to the gate terminal of the transistor M3 by the voltage-current conversion circuit 43 and the voltage applied to the gate terminal of the transistor M4 by the bias circuit 45.

Figure 7B:
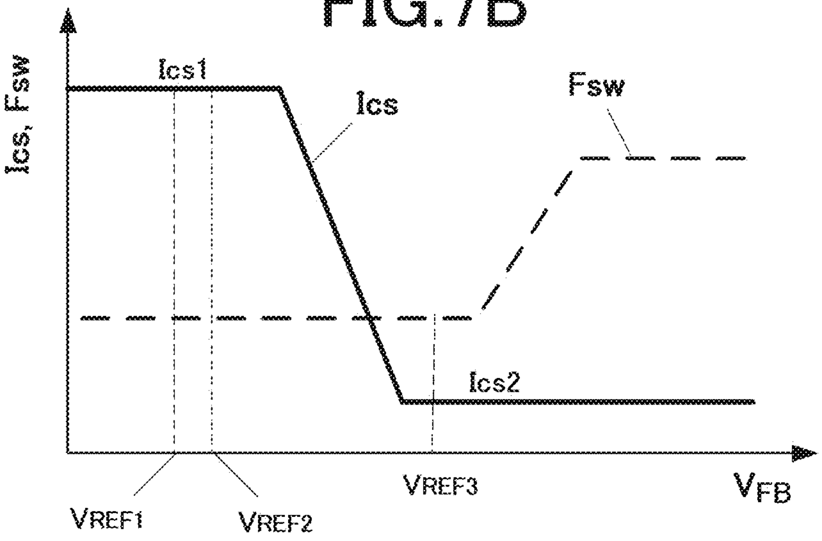
FIG. 7B is a graph showing the relation among the feedback voltage, the switching frequency, and the complementary current of the power control semiconductor device in the embodiment.

The complementary current circuit 34 configured as described above generates the complementary current Ics that has a characteristic of becoming large when the voltage VFB is in a low range, becoming small when the voltage VFB is in a high range, and changing relatively rapidly when the voltage VFB is in a middle range, as shown in FIG. 7B. The complementary current Ics is flown to the complementary resistor Rc, which is provided outside the power control IC 13 and connected to the current detection terminal CS.

As the solid line in FIG. 7B shows, when the voltage VFB of the external terminal FB is at the reference voltage VREF2, a relatively large current (first reference current Ics1) is flown to the complementary resistor Rc provided outside the power control IC 13. When the voltage VFB of the external terminal FB is at the reference voltage VREF3, a relatively small current (second reference current Ics2) is flown to the complementary resistor Rc provided outside the power control IC 13. The current Ics1 is greater than the current Ics2.

According to the power control IC 13 in this embodiment that includes the complementary current circuit 34 in FIG. 6, in the light load state where the voltage VFB at the external terminal FB is lower than the reference voltage VREF2, the voltage Vcs at the current detection terminal CS increases by the amount corresponding to the product of (complementary current Ics×complementary resistor Rc). Therefore, when the complementary current Ics is flown, the output (K1×Vcs) of the operational amplifier AMP1 reaches the voltage VFB of the external terminal FB earlier than when the complementary current Ics is not flown, and the turn-off signal TOFF output by the turn-off circuit 33 rises at an earlier timing.

As a result, one "ON" of the switching transistor SW1 inputs a less amount of energy to the transformer, and the average switching frequency increases, as compared with the case without the complementary current Ics. On the other hand, ripple of the output voltage Vout is reduced. In the medium to heavy load range where the voltage VFB at the external terminal FB is higher than the reference voltage VREF3, the complementary current Ics becomes small and does not largely affect the operation of the power control IC 13.

Hereinafter, the effect of the complementary current Ics and the complementary resistor Rc in the power control IC 13 is described in detail.

FIG. 7B shows the relation between the voltage VFB at the external terminal FB and the switching frequency Fsw in the power control IC 13. In FIG. 7B, the dashed line shows the relation between the voltage VFB and the switching frequency Fsw.

The complementary resistor Rc is selected in the range of 0 to 5 kΩ. The switching frequency Fsw (the inverse of the switching period) is determined so as to become low when VFB is low and become high when VFB is high.

The complementary voltage VCOMP generated by the complementary current Ics and the complementary resistor Rc is expressed as: VCOMP=Rc×Ics. Here, Ip represents the current flowing through the current detection resistor Rs connected in series to the switching transistor SW1, and VLIM represents the input to the turn-off circuit 33 when the on-state current is at its peak. VLIM is expressed as: VLIM=Rs×Ip+VCOMP=Rs×Ip+Rc×Ics. On the assumption that VREF1=VREF2, the reference voltage of the turn-off circuit 33 in the burst operation is expressed as VREF1/K1 (K1 is the amplification factor of the turn-off circuit 33).

Based on the above description, the current Ip flowing through the current detection resistor Rs in the burst operation is expressed as: Ip=(VLIM−VCOMP)/Rs≈(VREF1/K1−Rc×Ics)/Rs. Thus, the greater the current detection resistor Rc is, the smaller the current Ip is.

Figure 8:
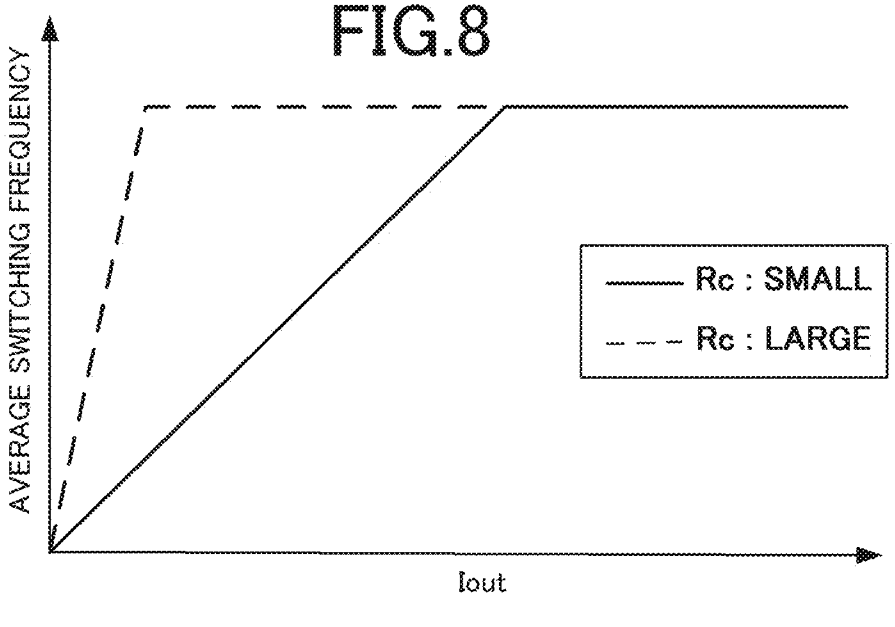
FIG. 8 is a graph showing the relation between the output current and the average switching frequency of the power control semiconductor device in the embodiment.

FIG. 8 shows the relation between the output current Iout and the average switching frequency Fsw when the complementary resistor Rc is large (dashed line) and the relation between Iout and Fsw when the complementary resistor Rc is small (solid line). As shown in FIG. 8, in the burst operation range in which the output current Iout is small, the larger the complementary resistor Rc is, the higher the average switching frequency is. Therefore, with a large complementary resistor Rc, the average switching frequency increases and the efficiency decreases, whereas the output ripple can be reduced.

On the other hand, in the heavy load state where the burst operation is not performed (i.e., the voltage VFB is high), the complementary current Ics is not required. By reducing the complementary current Ics in the heavy load state as in the embodiment, the loss in the power control IC 13 decreases by the amount of the reduction of the complementary current Ics, and the efficiency increases. For example, when the complementary current Ics2 is set to 1/50 of Ics1, the complementary voltage VCOMP in the heavy load state is 1/50 of the voltage COMP in the burst operation. Thus, the load-frequency characteristics in the heavy load state are less affected by the complementary resistor. That is, the complementary resistor Rc does not largely affect the operation in the heavy load state and performs adjustment almost only in the burst operation.

According to the power control IC 13 in this embodiment, in the normal state, the complementary current circuit 34 outputs the complementary current Ics to the current detection terminal CS depending on the load. When the wiring to the current detection terminal CS is disconnected and an open circuit occurs, the complementary current Ics does not flow. To deal with this, there may be provided a circuit that checks whether the complementary current flows or not, based on the electric potential at the current detection terminal CS (e.g., a voltage comparator circuit). When such a circuit detects an open circuit at the terminal CS, the latch circuit 35 may be reset to turn off the switching transistor SW1 or the period timer circuit 32 may be stopped, for example, to prevent abnormal heating or other abnormalities of the power supply device. There may also be provided an external terminal that outputs an abnormality notification signal to the outside when an open circuit of the current detection terminal CS is detected.

The power control IC may not be provided with the above open-circuit detection circuit. For example, according to JP7032648B, a power control constituting a switching power supply is provided with an overcurrent protection function. When the voltage Vcs at the current detection terminal CS is equal to or greater than a predetermined electric potential, the power control IC according to JP7032648B detects an overcurrent state and stops the switching operation or turns off the switching element.

According to the power control IC with such an overcurrent protection function, when an open circuit occurs at the terminal CS, the complementary current circuit 34 pulls up the voltage VCS at the current detection terminal CS to a level higher than the overcurrent detection level, and the overcurrent protection function is activated to stop the switching operation or turn off the switching transistor SW1. Thus, the present embodiment may be modified to a power control IC provided with an overcurrent protection function.

Alternatively, the overvoltage protection function of the power control IC may be utilized to stop the switching operation or to turn off the switching transistor SW1 when an open circuit occurs at the terminal CS.

Following is the description on how the operation and characteristics differ when the complementary resistor Rc is an element having a small resistance value and when the complementary resistor Rc is an element having a large resistance value in the switching power supply device (FIG. 1) employing the power control IC 13 in this embodiment, with reference to FIG. 9 to FIG. 14.

Figure 9:
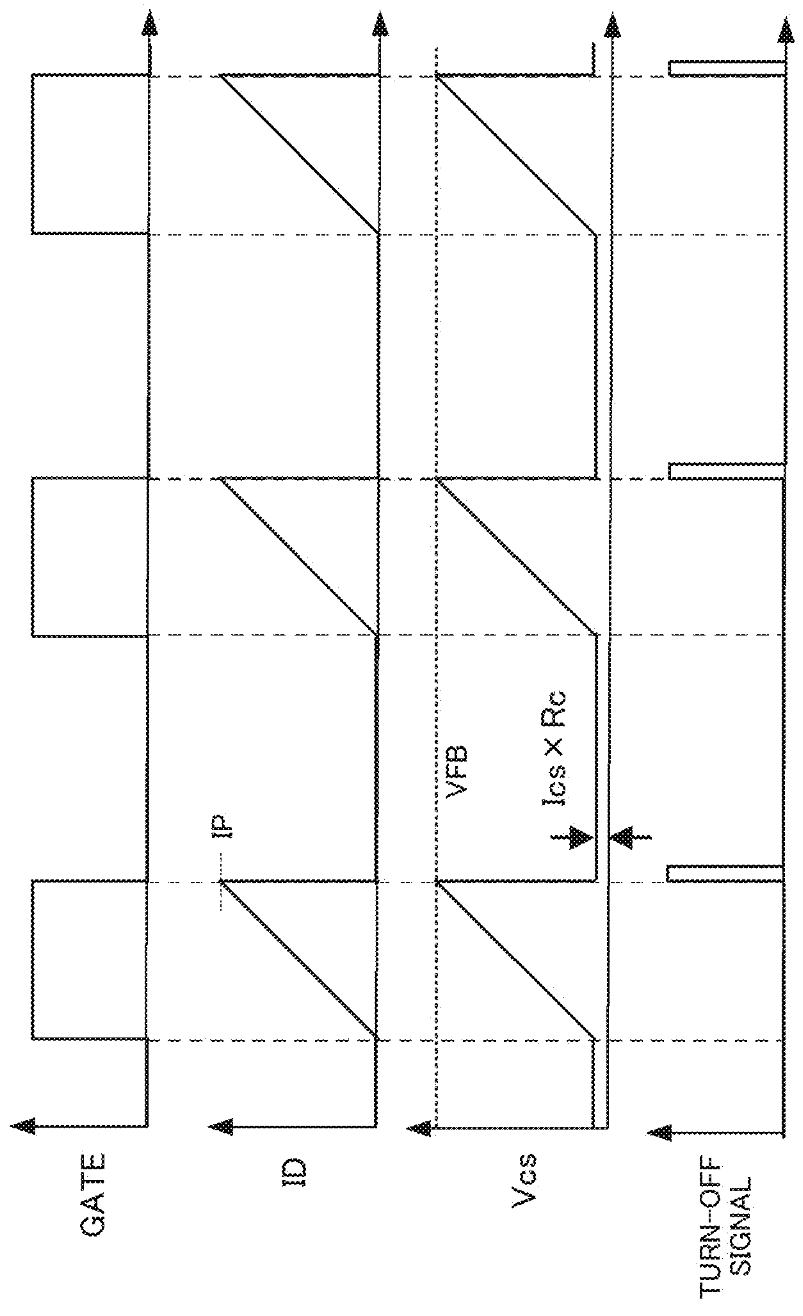
FIG. 9 is a timing chart of the power control semiconductor device in the PWM operation in the medium to heavy load state in the embodiment, wherein the complementary resistor is an element having a small resistance value.
Figure 10:
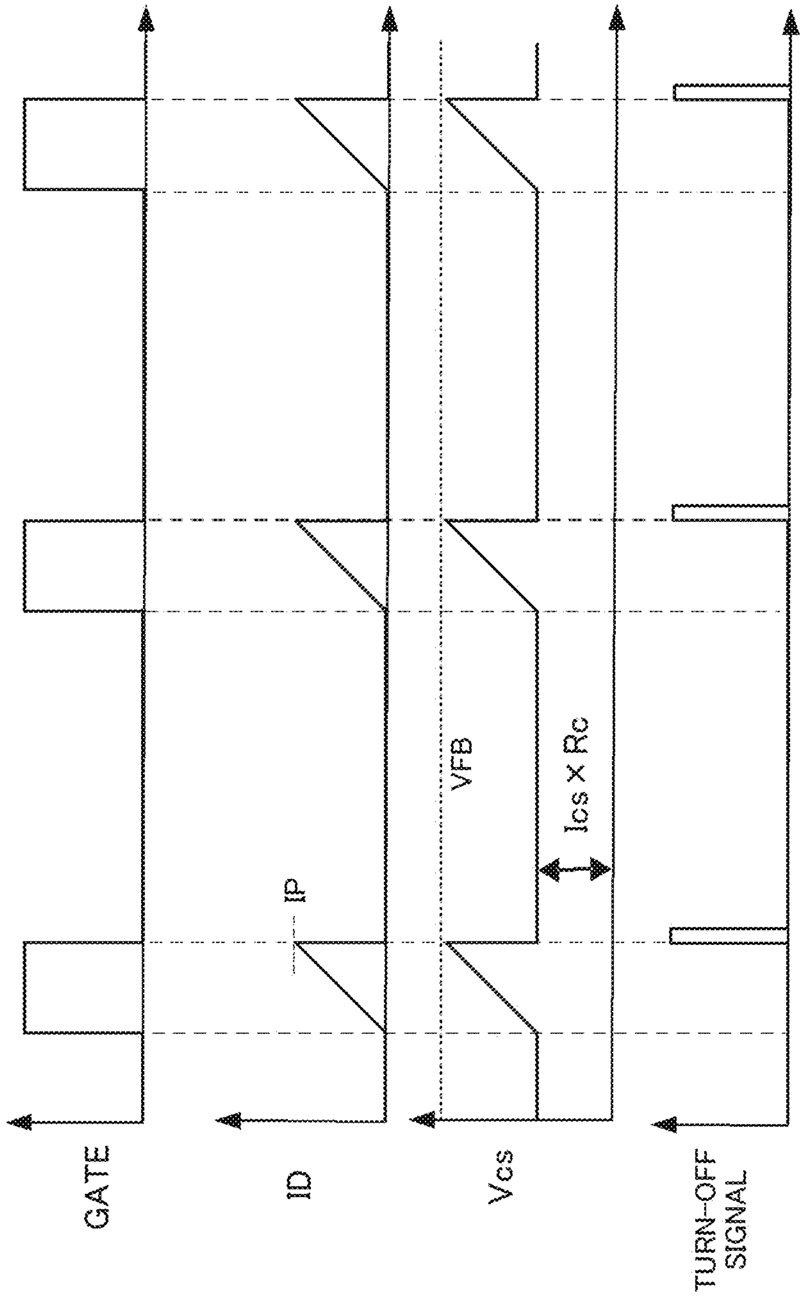
FIG. 10 is a timing chart of the power control semiconductor device in the PWM operation in the medium to heavy load state in the embodiment, wherein the complementary resistor is an element having a large resistance value.

FIG. 9 shows a timing chart in the PWM operation in the medium to heavy load state when the complementary resistor Rc is an element having a small resistance value. FIG. 10 shows a timing chart in the PWM operation in the medium to heavy load state when the complementary resistor Rc is an element having a large resistance value. In the Figures, ID shows the waveform of the drain current flowing through the switching transistor SW1.

In comparison of the waveforms of the drain current ID between FIG. 9 and FIG. 10, the peak value of ID (drain current peak) is higher in FIG. 9, where the complementary resistor Rc has a small resistance value, than in FIG. 10, where the complementary resistor Rc has a large resistance value. The higher the drain current peak is, the greater energy is input to the primary-side wiring of the transformer by one "ON" of the switching transistor SW1, and the lower the average switching frequency is. As a result, switching losses caused by the on/off operation of the switching transistor SW1 are reduced, and the efficiency increases.

Figure 11:
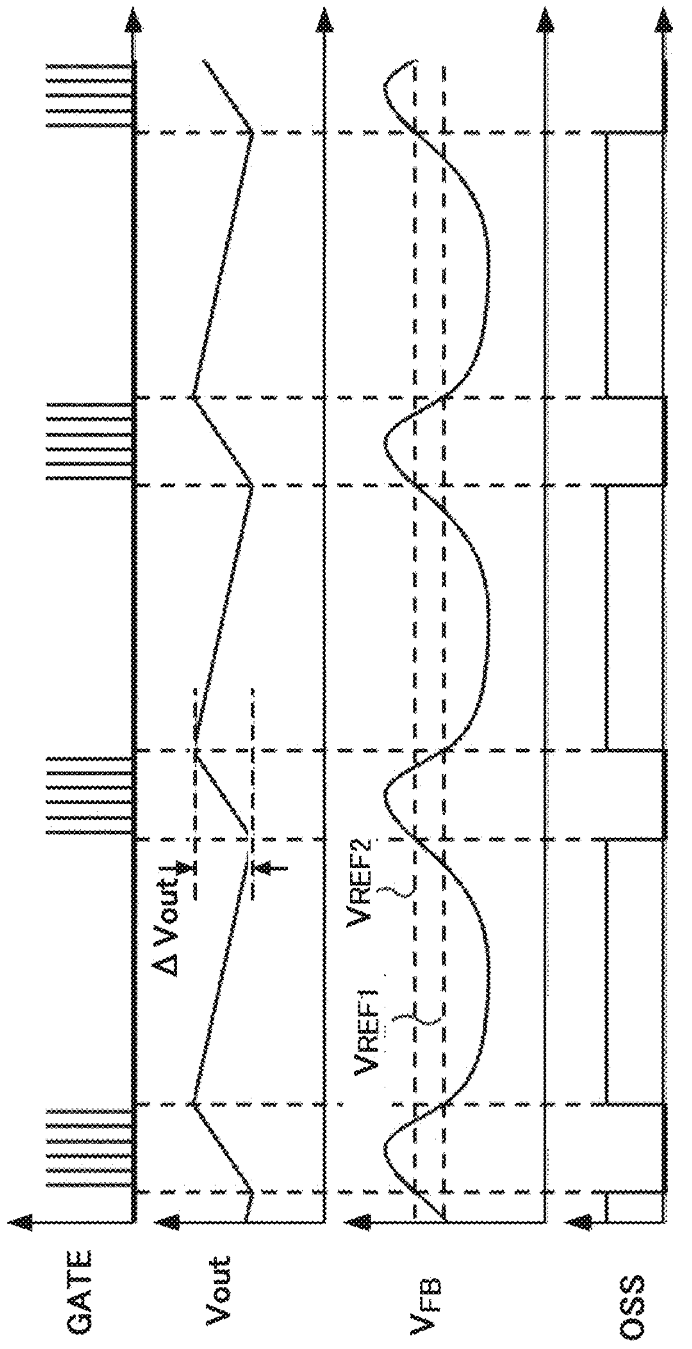
FIG. 11 is a timing chart of the power control semiconductor device in the burst operation (when the load is light) in the embodiment, wherein the complementary resistor is an element having a small resistance value.
Figure 12:
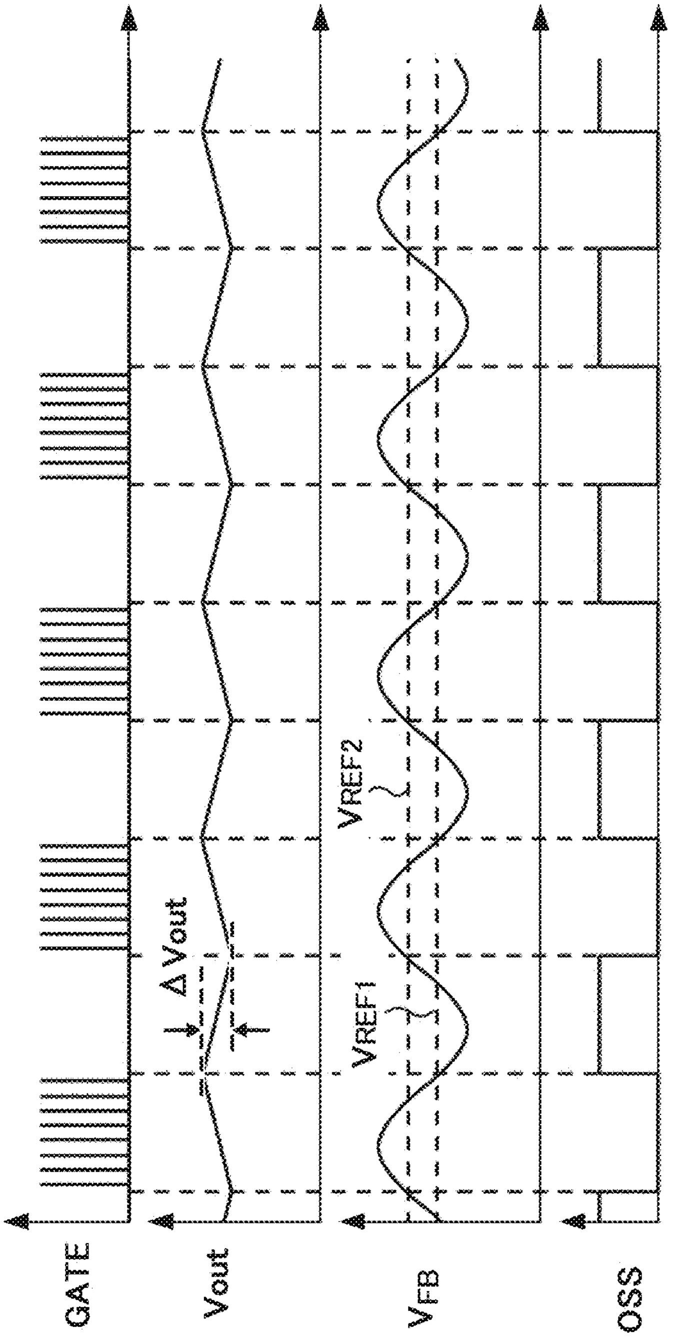
FIG. 12 is a timing chart of the power control semiconductor device in the burst operation (when the load is light) in the embodiment, wherein the complementary resistor is an element having a large resistance value.

FIG. 11 shows a timing chart in the burst operation when the load is light and an element having a small resistance value is used as the complementary resistor Rc. FIG. 12 shows a timing chart in the burst operation when the load is light and an element having a large resistance value is used as the complementary resistor Rc. The period during which the switching stops (the period during which the oscillation stop signal OSS is high) is shorter in FIG. 12, where the complementary resistor Rc has a large resistance value, than in FIG. 11, where the complementary resistor Rc has a small resistance value. As a result, in comparison of the waveforms of the output voltage Vout between FIG. 11 and FIG. 12, the size of output ripple ΔVout is smaller in FIG. 12 than in FIG. 11.

Figure 13:
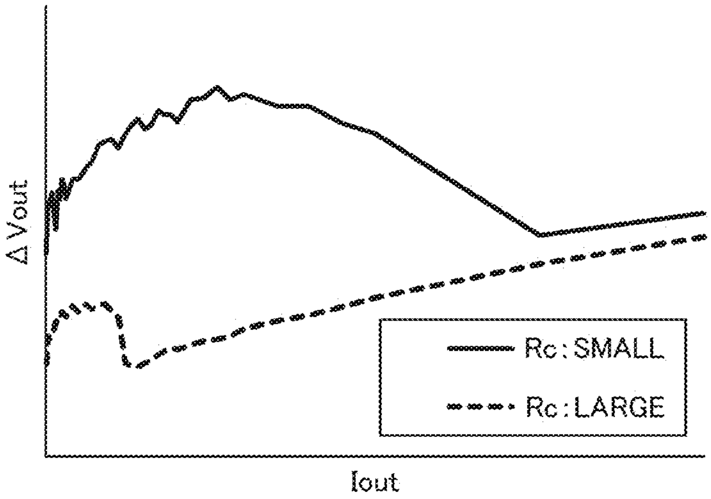
FIG. 13 is a graph showing the relation between the output current and the output ripple when the complementary resistor has a large resistance value and when the complementary resistor has a small resistance value in the power control semiconductor device in the embodiment.
Figure 14:
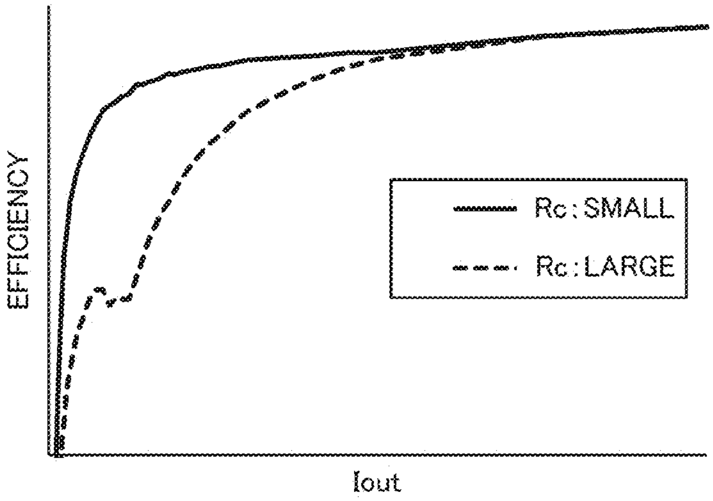
FIG. 14 is a graph showing the relation between the output current and the efficiency when the complementary resistor has a large resistance value and when the complementary resistor has a small resistance value in the power control semiconductor device in the embodiment.

FIG. 13 shows the relation between the output current Iout and the size of output ripple ΔVout when the resistance value of the complementary resistor Rc is large and when the resistance value of the complementary resistor Rc is small in a switching power supply employing the power control IC 13 in this embodiment. The relation was calculated based on the simulation. FIG. 14 shows the relation between the output current Iout and the power efficiency when the resistance value of the complementary resistor Rc is large and when the resistance value of the complementary resistor Rc is small.

In FIG. 13 and FIG. 14, solid lines show the characteristics when the resistance value of the complementary resistor Rc is small, and dashed lines show the characteristics when the resistance value of the complementary resistor Rc is large. As shown in FIG. 13, in the range where the output current Iout is small, a larger resistance value of the complementary resistor Rc results in smaller output ripple. As shown in FIG. 14, in the range where the output current Iout is small, a smaller resistance value of the complementary resistor Rc results in higher power efficiency.

In view of the above, to design a switching power supply device prioritizing suppression of the output voltage ripple over power efficiency, an element having a large resistance value may be used as the complementary resistor Rc to be connected to the current detection terminal CS. Conversely, to design a switching power supply device prioritizing power efficiency over suppression of the output voltage ripple, an element having a small resistance value may be used as the complementary resistor Rc. According to the power control Ic in the above embodiment, the relation between the power efficiency and the output ripple in a trade-off relation can be easily adjusted with the external complementary resistor Rc without changing the IC in use.

Following is the description on how phenomena differ between (i) the case where the adjusting resistor (Rt) connected to the external terminal (ADJ) of the power control IC according to the above-mentioned JP6424644B is changed and (ii) the case where the adjustment resistor (Rc) connected to the external terminal (CS) of the power control IC in this embodiment is changed.

TABLE 1 shows the differences between the cases (i) and (ii). In TABLE 1, "known art" refers to the power control IC disclosed in JP6424644B. In TABLE 1, the thick line indicates undesirable phenomena.

TABLE I

| | KNOWN ART | | THIS EMBODIMENT | |
|---|---|---|---|---|
| COMPLEMENTARY RESISTOR | HIGH | LOW | HIGH | LOW |
| VREF1 | HIGH | LOW | CONSTANT | |
| ON-STATE CURRENT PEAK | HIGH | LOW | LOW | HIGH |
| AVERAGE SWITCHING FREQUENCY | LOW | HIGH | HIGH | LOW |
| EFFICIENCY IN BURST | HIGH | LOW | LOW | HIGH |
| OUTPUT RIPPLE | LARGE | SMALL | SMALL | LARGE |

As shown in TABLE 1, when the resistor (Rt) of the power control IC in the known art is changed from an element having a high resistance value to an element having a low resistance value, the reference voltage VREF1 changes from a high voltage to a low voltage. On the other hand, when the resistor (Rc) of the power control IC in this embodiment is changed from an element having a high resistance value to an element having a low resistance value, the reference voltage VREF1 does not change and remains constant.

When the resistor (Rt) of the power control IC in the known art is changed from an element having a high resistance value to an element having a low resistance value, the on-state current peak changes from "high" to "low"; the average switching frequency changes from "low" to "high"; the efficiency in the burst operation changes from "high" to "low"; and the output ripple changes from "large" to "small".

On the other hand, when the resistor (Rc) of the power control IC in this embodiment is changed from an element having a high resistance value to an element having a low resistance value, the on-state current peak changes from "low" to "high"; the average switching frequency changes from "high" to "low"; the efficiency in the burst operation changes from "low" to "high"; and the output ripple changes from "small" to "large". Thus, reverse phenomena are observed. The undesirable phenomena enclosed by solid lines are also different between the known art and this embodiment. Thus, it can be said that the invention disclosed in JP6424644B and the present invention are obviously different and have been conceived from different technical ideas.

According to the present invention, the power control IC includes the complementary current circuit that outputs the complementary current to the external terminal (current detection terminal CS) to which a voltage proportional to the current flowing through the switching element is input. According to such a configuration, the voltage at the external terminal CS shifts to a higher level by the voltage corresponding to the product of the current value of the output complementary current and the resistance value of the external resistor (complementary resistor) connected to the current detection terminal CS. Accordingly, the turn-off signal output by the turn-off circuit (current detection circuit) changes more quickly, and the switching period changes. The power control IC of the present invention therefore does not require an additional external terminal (ADJ) to connect an external resistor, unlike the invention disclosed in JP6424644B. Thus, the power control IC of the present invention can change the switching frequency control characteristics by external setting (the resistance value of the external complementary resistor) without increasing the number of external terminals.

Further, the power efficiency and the output ripple, which are in a trade-off relation, can be easily adjusted by changing the resistance value of the external resistor connected to the external terminal. Thus, a designer of the switching power supply device is allowed to determine which characteristic is prioritized, the power efficiency or the suppression of output ripple.

Although the present disclosure has been described in detail based on the embodiment, the present invention is not limited to the disclosed embodiment. Although the complementary current circuit 34 in the above embodiment is configured to output the complementary current Ics2 that is smaller than the complementary current Ics1 when the voltage VFB at the external terminal FB is higher than the reference voltage VREF3, the complementary current circuit 34 may be configured to output a zero current (Ics2=0) when VFB>VREF3.

Further, although the turn-off circuit 33 (current detection circuit) in the above embodiment generates the turn-off signal TOFF based on the comparison between the amplified voltage of the voltage Vcs at the current detection terminal CS and the voltage VFB at the feedback terminal FB, the turn-off circuit 33 may generate the turn-off signal TOFF based on the comparison between the voltage Vcs at the terminal CS and the divided voltage into which the voltage VFB at the feedback voltage VFB is divided.

Further, although the period timer circuit 32 in the above embodiment is configured to generate the frequency-variable period signal PS, the frequency of the period signal PS may be constant.

Further, although the switching transistor SW1 that intermittently flows current to the primary-side winding of the transformer does not constitute the power control IC 13 in the above embodiment, the switching transistor SW1 may be included in the power control IC 13 to constitute one semiconductor integrated circuit.

Further, although the present invention is applied to the power control IC that constitutes a flyback AC-DC converter in the above embodiment, the present invention may be applied to a power control IC that constitutes a forward AC-DC converter or an AC-DC converter using the pseudo-resonance operation.

Although the embodiment of the present disclosure has been described and illustrated in detail, the disclosed embodiment is made for purposes of illustration and example only and not limitation. The scope of the present invention should be interpreted by terms of the appended claims.

The invention claimed is:

1. A switching power supply device comprising:

a transformer for voltage conversion that includes a primary-side winding to which a direct voltage is applied and a secondary-side winding;

a switching element connected in series to the primary-side winding;

a power control semiconductor device that generates and outputs a control signal for performing ON/OFF control of the switching element; and a current-voltage conversion element that is connected in series to the switching element and that converts a current flowing through the primary-side winding into a voltage, wherein the switching power supply device intermittently flows a current to the primary-side winding by performing ON/OFF control of the switching element, rectifies and smooths a current induced in the secondary-side wiring, and outputs a direct current voltage, wherein the power control semiconductor device includes a first external terminal that receives a voltage or a current corresponding to an output detection signal from a secondary side of the transformer, a second external terminal that receives the voltage into which the current is converted by the current-voltage conversion element, a period signal generation circuit that generates a period signal for giving timing to periodically turn on the switching element, a current detection circuit that generates a signal for giving timing to turn off the switching element, based on a voltage or a current at the first external terminal and a voltage at the second external terminal, and a complementary current circuit that generates a complementary current to be output to the second external terminal, wherein a complementary resistor is provided between the second external terminal and the current-voltage conversion element.

2. The switching power supply device according to claim 1, wherein the complementary current circuit outputs the complementary current at least when a load is light, wherein the period signal generation circuit stops generating the period signal or stops outputting the period signal, based on whether the voltage or the current at the first external terminal is greater or smaller than a predetermined reference value that is set in a light load range.

3. The switching power supply device according to claim 2, wherein, based on the voltage at the first external terminal, in the light load range, the complementary current circuit outputs the complementary current having a first current value, and in a heavy load range, the complementary current circuit outputs the complementary current having a second current value smaller than the first current value.

4. The switching power supply device according to claim 3, wherein the period signal generation circuit includes a frequency-variable oscillator circuit, wherein, based on the voltage at the first external terminal, in the light load range, the period signal generation circuit generates the period signal having a long period, and in the heavy load range, the period signal generation circuit generates the period signal having a short period.

5. The switching power supply device according to claim 2, further comprising a light-load determination circuit that determines whether the load is light or not, based on the voltage at the first external terminal, wherein when the voltage at the first external terminal is lower than a first voltage value corresponding to the reference value, the light-load determination circuit determines that the load is light, wherein when the voltage at the first external terminal is higher than a second voltage value that is greater than the first voltage value, the light-load determination circuit determines that the load is not light, wherein in response to the light-load determination circuit determining that the load is not light, the period signal generation circuit generates and outputs the period signal, wherein in response to the light-load determination circuit determining that the load is light, the period signal generation circuit stops outputting the period signal.

6. A power control semiconductor device constituting a switching power supply device that intermittently flows a current to a primary-side winding of a transformer for voltage conversion by performing ON/OFF control of a switching element connected in series to the first-side wiring and that rectifies and smooths a current induced in a secondary-side wiring of the transformer to output a direct current voltage, the semiconductor device comprising:

a first external terminal that receives a voltage or a current corresponding to an output detection signal from a secondary side of the transformer;

a second external terminal that receives a voltage corresponding to a current flowing through the switching element;

a period signal generation circuit that generates a period signal for giving timing to periodically turn on the switching element;

a current detection circuit that generates a signal for giving timing to turn off the switching element, based on a voltage or a current at the first external terminal and a voltage at the second external terminal;

a control signal generation circuit that generates a control signal for turning on and off the switching element;

a light-load determination circuit that determines whether a load is light or not, based on the voltage or the current at the first external terminal; and a complementary current circuit that generates a complementary current to be output to the second external terminal, wherein in response to the light-load determination circuit determining that the load is not light, the period signal generation circuit generates and outputs the period signal, wherein in response to the light-load determination circuit determining that the load is light, the period signal generation circuit stops outputting the period signal, wherein, based on the voltage or the current at the first external terminal, in a light load range, the complementary current circuit outputs the complementary current having a first current value, and in a heavy load range, the complementary current circuit outputs the complementary current having a second current value smaller than the first current value.

* * * * *